Oct. 22, 1940.      M. H. SMITH      2,218,860
SPRAYER
Filed Oct. 31, 1938      2 Sheets-Sheet 1
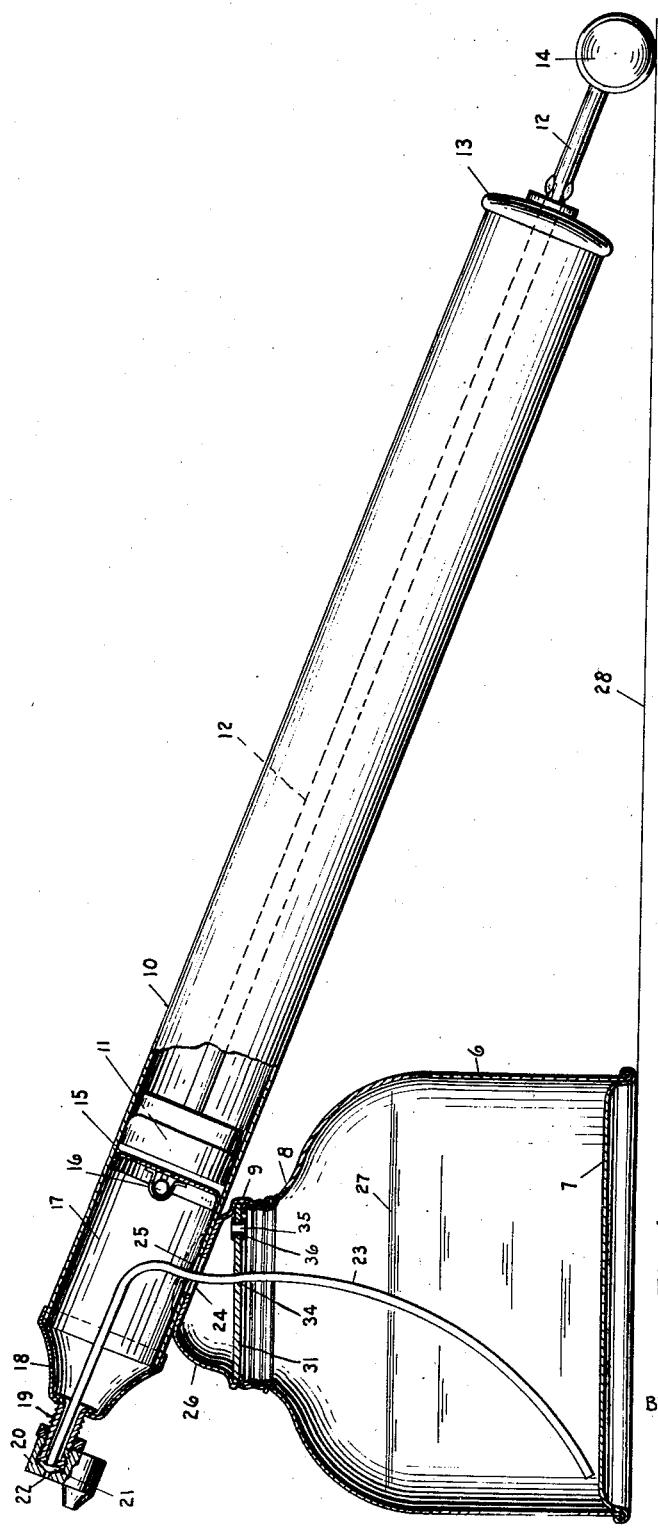
INVENTOR
MYRON H. SMITH
BY Martin & Rendell
ATTORNEYS Oct. 22, 1940. M. H. SMITH 2,218,860
SPRAYER
Filed Oct. 31, 1938 2 Sheets-Sheet 2
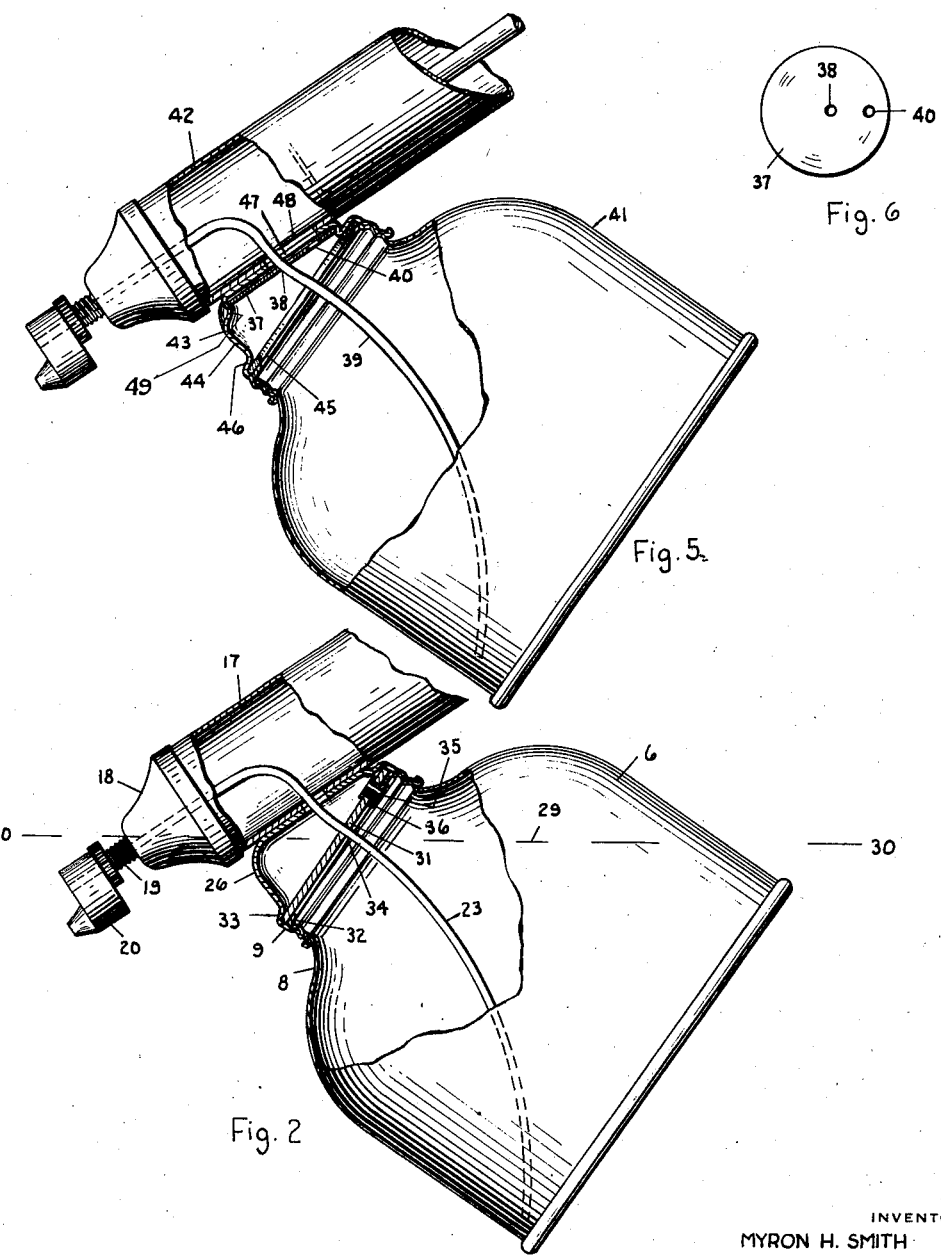
INVENTOR
MYRON H. SMITH
BY Martin & Rendell
ATTORNEYS Patented Oct. 22, 1940

2,218,860

UNITED STATES PATENT OFFICE 2,218,860

SPRAYER

Myron H. Smith, New Hartford, N. Y., assignor to D. B. Smith & Company, Inc., Utica, N. Y., a corporation of New York Application October 31, 1938, Serial No. 237,903

4 Claims. (Cl. 299—89)

My present invention relates to portable hand-operated continuous sprayers of the type where the pump cylinder is secured to the neck of an upright relatively small receptacle.

It has been common heretofore to provide sprayers of this type with the forward part of the cylinder of the pump detachably secured to the neck of the relatively small liquid receptacle and with the pump cylinder in horizontal position when the receptacle is in vertical position as when its bottom rests upon a bench or the floor. One annoying disadvantage of this style of sprayer is that the rearwardly extending portion of the pump cylinder and its piston rod and handle are heavy enough and, by reason of their overhanging length have such a leverage against the receptacle as to tend to tip over the receptacle, especially when it is not nearly full of liquid, until the pump cylinder touches the floor or the ground and then usually the receptacle tips sidewise until it is not only on its side, but usually with its neck slanting downwardly and with the cylinder of the pump resting flat upon the ground. In this position the spraying liquid can leak out after a little time and in any event the liquid will flow into the compressed air chamber at the forward end of the cylinder and interfere with the regular spraying operation when the sprayer is taken up again for work. In this tipped-over position also the liquid tends to leak out, thus wasting material and allowing the spraying liquid to spread outside of the pump cylinder and about the receptacle where it comes into contact with the hand when the sprayer is picked up again for operation.

It is the main purpose of my present invention to provide a sprayer of the type indicated wherein means are provided for preventing this capsizing of the sprayer when it is put down upon the floor or upon the ground. To accomplish this purpose I mount the forward end of the cylinder of the pump in an angular position upon the cap, which is secured to the neck of the receptacle so that when the receptacle is placed with its bottom upon a bench or upon the floor or other level support the cylinder of the pump will slant downwardly as it projects away from the receptacle at such an angle that the handle of the pump will rest upon the floor or said other support and thus take a large part of the weight of the overhanging rear end of the pump cylinder and its piston rod and so prevent the first capsizing of the sprayer. This angular mounting of the pump cylinder however has the necessary result that when the sprayer is pointed downwardly as is often required in spraying small plants or other small things upon the ground or close to the ground, the receptacle is tipped much farther from a vertical position and in fact far enough often to allow the spraying liquid to run or spill over into the air chamber in the forward end of the cylinder and thus flood the sprayer with liquid, resulting in poor operation of the sprayer and getting for the time a solid stream of spraying liquid instead of a mixture of air and liquid in the form of a spray, as is desired. One main purpose of my invention is to provide means for overcoming this disadvantage and for preventing the running or spilling of the spraying liquid over into the said forward air chamber even when the nozzle of the sprayer is pointed sharply downward. A further purpose is to provide means for accomplishing this result which are simple and inexpensive to make and install in the sprayer and which do not interfere with the effective regular operation of the sprayer and which will not interfere with the detachment of the pump and its attached cap from the neck of the receptacle, as for filling or cleaning the sprayer, and which means will not interfere at all with the subsequent attachment of the pump to the neck of the sprayer. Further purposes and advantages of this invention will appear from the specification and claims herein.

Fig. 1 is a vertical central sectional view through the receptacle and the forward part of the pump of a sprayer embodying this invention, the rear end of the pump and the liquid supply tube, however, being in side elevation, the sprayer being in the position it occupies when resting upon a table, the floor or other level support, the receptacle being in upright position and the pump cylinder slanting downwardly as it extends to the rear and with the handle resting upon the same support.

Fig. 2 is a view of the sprayer shown in Fig. 1, the upper part of the receptacle and part of the forward end of the pump being in central section with the rest of the sprayer in side elevation, the sprayer being in the position it occupies when the pump and its nozzle are directed sharply downwardly.

Fig. 3 is a top or plan view of the disc 31 and Fig. 4 is a cross sectional view thereof on line 4—4 of Fig. 3.

Fig. 5 is a view similar to Fig. 2 of a modified form of the invention. Fig. 6 is a plan view of the disk or guard member 37.

Referring to the drawings in a more particular description and first to the form of the invention shown in Figs. 1-4, it will be seen that the sprayer comprises a receptacle 6 having a flat bottom 7 and a neck 8 at its upper end for the attachment thereto of the cap 9 to which is permanently attached the side of the forward end of the pump cylinder 10 in which is reciprocatingly mounted the piston 11 by means of its piston rod 12 extending out through the guide plug 13 at the rear end of the cylinder, with a suitable handle 14 secured to the rear end of said piston rod 12.

Spaced the proper distance back from the forward end of the tube forming the pump cylinder 10 there is provided a partition 15 extending transversely across said cylinder and with some form of a check valve 16 mounted thereon in the manner common to continuous sprayers of this type so that the forward end of the tube forming the pump cylinder becomes an air chamber 17 which, upon successive reciprocation of the piston becomes filled with compressed air to a sufficient extent to make the sprayer operate to deliver a continuous spray.

The forward end of the cylinder 10 has attached, preferably permanently, a funnel or truncated cone-shaped head 18 becoming smaller as it approaches its extended front end and there having permanently attached the air outlet pipe 19 upon the exteriorly threaded forward end of which is placed a nozzle 20, the front end of the cavity 21 of which usually functions as a final mixing chamber for the air and spraying liquid immediately before its exit from the nozzle outlet 22, shown in the sectioned portion of the nozzle in Fig. 1 as being at the forward end of said sectioned nozzle.

The usual liquid supply pipe 23 of relatively small size extends from the bottom of the receptacle preferably from the forward part thereof upwardly on a slant through the neck 8 and through the central part of the cap 9 and through registering holes 24 and 25 respectively in the dome portion 26 of the cap 9 and in the lower side wall of the cylinder opening into the air chamber 17. From these holes the said supply pipe is bent forward extending through the cylinder head 18 and then centrally through the air outlet pipe 19 from the inner sides of which it is spaced by reason of the relative small size of the air outlet pipe 19. At or near this end of the liquid supply pipe or tube and at the adjacent forward end of the air outlet pipe 19 any one of various common methods may be used to mix in proper proportion to make a spray, the air tending to rush out under pressure into the air outlet pipe 19 and so in general around the upper end of the liquid supply pipe or tube 23 and the liquid itself coming up through said pipe 23 partly under suction of the forwardly moving compressed air and partly under the direct forcing action of the compressed air acting upon the upper surface of the liquid 27 in the receptacle 6, for which air pressure upon the upper surface of the liquid the said holes 24 and 25 are provided in the dome 26 of the cap 7 and in the lower wall of the air chamber 17.

It will now be seen from inspection of Fig. 1 that I have provided a sprayer of the class described which will be free from the nuisance of capsizing when its receptacle is placed upon any level support and that this result is achieved by reason of the pump cylinder 10 being attached at such an angle to the desired level bottom 7 of said receptacle as to carry the pump cylinder 10 in a slanting position as it extends back or away from the receptacle so that the handle 14 of the piston rod 12 will, when the said handle and its attached parts are in forward position, rest upon the floor or other support 28 when the bottom of the receptacle is flat upon said support. In an obvious manner this prevents the capsizing of the receptacle no matter how much or little liquid there may be in the said receptacle.

If the sprayer were left as so far described it will be seen that when the pump cylinder and its nozzle are inclined downwardly, as will occur in many common uses of these relatively moderate-sized portable sprayers, and more or less to the position shown in Fig. 2, the receptacle 6 is turned decidedly to one side. In this position its lefthand side, that is the side under the nozzle, is turned down and the other or righthand side is turned proportionately upward and the spraying liquid 27 will of course find its level in said receptacle with the top level 29 of said liquid, being on a horizontal line 30—30, assuming the said receptacle to be about three-fourths or more full of the spraying liquid. When the sprayer is turned to this angular position it will be seen that the liquid on the lefthand side of the receptacle not only comes to the top of the receptacle itself but soon flows into that side of the dome 26 of the cap 9. It will now be seen that if the sprayer be even temporarily tipped farther down or if the liquid be allowed to surge back and forth in the receptacle and in the dome of the cap, as will easily happen due to the pushing and pulling motion given to the piston of the pump when the sprayer is being operated, the said spraying liquid will flow out through the openings 24 and 25 into the air chamber 17 and there for a greater or less length of time make a flooding of the sprayer by the said liquid occupying the space in the air outlet pipe 19 as well as some of the space in the funnel-shaped head 18 and in the forward end of the air chamber 17. Even a temporary flooding of this sort is unsatisfactory as it not only wastes the spraying liquid but puts a solid stream of liquid upon some parts of the object being sprayed and leaves other parts clear of liquid.

To overcome this disadvantage in a simple, practical and economical way is one of the main purposes of this invention. I accomplish this purpose by providing a leather or other fibrous disc 31, positioned and held in place at the top of the receptacle. This leather or similar partitioning disc or guard is commonly of circular shape, since ordinarily the neck 8 of the receptacle is circular in shape and exteriorly screw-threaded so as to receive the circular screw-threaded inner side of the lower part of the cap 9. Such screw-threading of these parts is a common form of getting the cap detachably secured to the neck of the receptacle and of course with these two parts being screw-threaded they will commonly be formed circular in shape so as to readily provide screw-threading in sheet metal parts. The said disc 31 will conveniently be held in place by having its periphery clamped between the inwardly extending flange 32 provided upon the upper end of the neck 8 and the shoulder 33 that extends slightly inwardly from the screw-threaded portion of the cap before the dome 26 proper of the cap begins. At a little above the center of the leather or other fibrous disc 31 as seen in Fig. 2 there is formed a small hole 34 through which extends the liquid supply pipe 23. This hole in the disc fits the said liquid supply pipe 23 with sufficient closeness as to form a practically liquid-tight joint. Even if a little liquid leaks through between the said pipe 23 and the said disc it will not be in sufficient quantity to fill up the lower portion of the dome of the cap for some time and so will cause no trouble even when the sprayer is tipped down as shown in Fig. 2 or even when tipped further down or when the liquid surges up about the joint formed by the hole 34 in said disc and around the pipe 23.

As already mentioned, however, this type of sprayer depends for ease and definiteness in spraying as well as for continuous spraying upon there being air pressure communicated to the top level of the liquid from the air pressure maintained in the air chamber 17. In order to provide for such communication of the air pressure from the air chamber 17 to the upper part of the receptacle no matter how much said receptacle may be tipped, as shown in Fig. 2, I have provided, in what is the upper side of said disc when the sprayer is in this position, a small air passage, being a hole 35, entirely through the said disc, just in from the zone of said disc where it is clamped between the neck of the receptacle and the shoulder of the cap. Preferably in order to keep this opening clear and free from being gradually filled up by the leather or other fibrous material of the disc spreading out into the hole, the said hole is provided with a metal eyelet 36. This eyelet is of the type common to leather and fibrous material work, having an annular flange at both the top and bottom faces of the disc connected by a short annular, tubular middle portion.

It will now be seen that this air passage or hole 35 when placed more or less as shown in Fig. 2, is considerably above the upper level of the spraying liquid and will be normally above the said upper level of the spraying liquid even though the sprayer be turned down further than shown in Fig. 2 or even though, (which is very unusual), the said receptacle be fuller of liquid than indicated by the line 30—30 on said Fig. 2. Furthermore it will be obvious that this air passage 35, being thus upwardly positioned, will prevent any sufficient amount of liquid flowing through said passage 35, (even though the liquid be allowed to temporarily surge back and forth violently) as would fill the lower lefthand side of the dome 26 of the cap soon enough to allow any considerable part of the liquid to flow over through the holes 24 and 25 into the air chamber. It will be understood of course that in the normal use of these portable hand-operated sprayers they will frequently be brought to an upright position as the person moves the sprayer about from one place to another. During such intervals between the down-turned and upright positions of the sprayer any liquid that might, under extreme circumstances, have leaked through the said passage 35 will readily flow back through that passage into the receptacle itself.

It will now be seen that I have provided a simple, practical and very economical but efficient means of preventing the flooding of this type of sprayer even though the receptacle be turned on its side more than is usual, due to the angular position of the pump upon the sprayer receptacle. Ordinarily the said disc will remain against the shoulder 33 of the cap 9 when the pump and receptacle are disconnected by unscrewing the cap from the neck of the receptacle, as for replenishing the liquid in the sprayer or for emptying out the unused portion of the liquid or for cleaning the parts of the sprayer. If required, for more extensive cleaning the disc 31 can be removed from the cap 9 by inserting a hooked wire or the head of a small wire nail through the eyelet 36 and pulling the said eyelet part of the disc outward from the cap until its edge can be reached by the hand, when the disc can be drawn off from the lower end of the liquid supply tube or pipe 23 if desired. In again assembling the parts care will be taken to slip the lower end of the pipe or tube 23 through the said hole 34 and to place the eyeleted hole or air passage 35 in the part or side of the cap that will be away from the nozzle.

In such demounting of the pump from the liquid holding receptacle to replenish or to empty the liquid, it will be seen that the liquid supply pipe remains assembled upon the pump and so prevents loss of that pipe during the frequent times when the spraying liquid is to be replenished or emptied or the device casually cleaned.

Fig. 5 is a combined side elevation and longitudinal sectional view similar to Fig. 2, but illustrating a modification of the invention. In this modification the disc or guard member 37 having the hole 38 therein for the close passage therethrough of the liquid pipe 39 and also having the small air passage 40 for equalizing the air pressure in the receptacle 41 and in the air chamber 42, is placed (preferably more or less removably) in the upper part of the dome 43 of the cap 44. Commonly a narrow gasket 45 of resilient material as rubber or the like is interposed in this style of a sprayer between the top of the neck of the receptacle and a downwardly facing flange 46 on the lower part of the cap 44 to make that joint liquid tight. Accordingly as the disc 37 no longer serves as such a gasket at that place, the disc may be of harder rubber or even metal. It will be understood that in this form of my invention there will be of course the hole 47 through the dome 43 of the cap and the registering hole 48 through the adjacent lower wall of the air chamber 42 to allow the liquid pipe 39 to pass into the air chamber 42. These holes 47 and 48 or at least the lower hole 48 in the dome of the cap will be extended rearwardly far enough to provide the necessary air communication to the air hole 40 in the disc 37.

It will be understood that the modified form shown in Fig. 5 is the same as the first form of my invention shown in Figs. 1 to 4 except as to the placing of the guard disk 37 in the upper part of the dome of the cap instead of between the lower part of the cap of the receptacle. While this upper position of the guard allows the spraying liquid to come up into the dome of the cap it is prevented from passing through the necessary working holes 47 and 48 through which passes the liquid supply pipe 39 by reason of the guard 37 and the close fit of the guard around said pipe 39. It will be seen that when a sprayer embodying this invention is tipped downwardly as shown in Fig. 5, the air passage 40 in the guard 37 is at almost the highest part of the said guard and so will not be flooded when the receptacle is supplied with the ordinary amount of spraying liquid. A few drops that might pass through this air passage 40 during temporary surging of the liquid would be ordinarily taken care of by the usual operation of the sprayer and furthermore even these few drops would usually run back through the air hole 40 when the sprayer is returned to upright position either permanently or temporarily. The guard 37 as shown in Fig. 5 is represented as being held in place by ears 49 pressed out upon the dome of the cap. The guard will be snapped past these when originally put in position but may be with proper care removed when really required.

What I claim as new and desire to secure by Letters Patent is:

1. In a continuous, hand-operated, portable sprayer, the combination of a liquid receptacle having a filling neck at its upper end, a cap detachably secured to said neck, a pump cylinder having its forward part permanently attached to said cap, a check-valved partition in the cylinder spaced from its forward end and forming an air chamber in the forward part of said cylinder, a piston reciprocatingly mounted in said cylinder to the rear of said partition, a piston rod projecting rearwardly from the piston to a point beyond the cylinder and there provided with a handle, registering apertures through the lower side of the wall of said air chamber and through the top of said cap, an air outlet pipe at the forward end of said air chamber, a liquid supply pipe leading from the lower forward part of the receptacle upwardly through said apertures through said air chamber and centrally forward into the said air outlet pipe and a guard member secured to the cap above the upper end of the neck of said receptacle and having a small opening towards its center for the close passage therethrough of said liquid supply pipe and having an air passage therethrough near its periphery and away from the front of the sprayer, said pump cylinder being attached to the cap at such a downwardly and rearwardly slanting angle relative to the axis of the receptacle as will cause the forwardly positioned handle of the sprayer to rest upon the same support as that upon which the bottom of the receptacle is placed, said liquid supply pipe normally remaining assembled upon the pump cylinder and in the air outlet pipe during disconnection of the pump cylinder from the liquid receptacle for replenishing or emptying the liquid or for casual cleaning of the device but the said liquid supply pipe being entirely removable from and replaceable into the cylinder and the air outlet pipe for more thorough cleaning or replacement.

2. In a continuous, hand-operated, portable sprayer, the combination of a liquid receptacle having a filling opening at its top, a cap detachably secured to said top, a tubular member having a transversely extending check-valved partition spaced back from its forward extremity and forming an air chamber forward of said partition and a pump cylinder rearward thereof, said forward part of the tubular member being permanently attached to said cap but having an air passage open through said cap, a piston reciprocatingly mounted in said tubular member to the rear of said partition, a piston rod projecting rearwardly from the piston to a point beyond the said tubular member and there provided with a handle, an air outlet pipe at the forward end of said air chamber, a liquid supply pipe leading from the lower forward part of the receptacle upwardly through said air passage in the cap through said air chamber and centrally forward into the said air outlet pipe, and a guard member secured to the cap above the filling opening of the receptacle and having a small opening towards its center for the close passage therethrough of said liquid supply pipe and having an air port therethrough near its periphery and away from the front of the sprayer, said pump cylinder being attached to the cap at such a downwardly and rearwardly slanting angle relative to the receptacle as will cause the forwardly positioned handle of the sprayer to rest upon the same support as that upon which the bottom of the receptacle is placed, said liquid supply pipe normally remaining assembled upon the pump cylinder and in the air outlet pipe during disconnection of the pump cylinder from the liquid receptacle for replenishing or emptying the liquid or for casual cleaning of the device but the said liquid supply pipe being entirely removable from and replaceable into the cylinder and the air outlet pipe for more thorough cleaning or replacement.

3. In a continuous, hand-operated, portable sprayer, the combination of a liquid receptacle having a filling opening at its top, a cap detachably secured to said top, a tubular member having a transversely extending check-valved partition spaced back from its forward extremity and forming an air chamber forward of said partition and a pump cylinder rearward thereof, said forward part of the tubular member being permanently attached to said cap but having an air passage open through said cap, a piston reciprocatingly mounted in said tubular member to the rear of said partition, a piston rod projecting rearwardly from the piston to a point beyond the said tubular member and there provided with a handle, an air outlet pipe at the forward end of said air chamber, a liquid supply pipe leading from the lower forward part of the receptacle upwardly through said air passage through said air chamber and centrally forward into the said air outlet pipe, and a guard member detachably secured to the cap above the filling opening of the receptacle and having a small opening towards its center for the close passage therethrough of said liquid supply pipe and having an air port therethrough near its periphery and away from the front of the sprayer, said pump cylinder being attached to the cap at such a downwardly and rearwardly slanting angle relative to the receptacle as will cause the forwardly positioned handle of the sprayer to rest upon the same support as that upon which the bottom of the receptacle is placed, said liquid supply pipe normally remaining assembled upon the pump cylinder and in the air outlet pipe during disconnection of the pump cylinder from the liquid receptacle for replenishing or emptying the liquid or for casual cleaning of the device but the said liquid supply pipe being entirely removable from and replaceable into the cylinder and the air outlet pipe for more thorough cleaning or replacement.

4. In a continuous, hand-operated, portable sprayer, the combination of an upstanding liquid receptacle having a bottom forming the supporting base therefor and having an opening at its upper part, a cap secured to said opening, a tubular member having a transversely extending check-valved partition spaced back from its forward extremity and forming an air chamber forward of said partition and a pump cylinder rearward thereof, said air chamber part of the tubular member being permanently attached to said cap but having an air passage open through said cap and lower wall of the air chamber, a piston reciprocatingly mounted in said tubular member to the rear of said partition, a piston rod projecting rearwardly from the piston to a point beyond the said tubular member and there provided with a handle, an air outlet pipe at the forward end of said air chamber, a liquid supply pipe leading from the lower forward part of the receptacle upwardly through said air passage in the cap through said air chamber and centrally forward into the said air outlet pipe, and a guard member secured to the cap with a hole toward its center for conducting therethrough in substantially leak-proof manner, said liquid supply pipe, but having an air port therethrough nearer its periphery on the rearward side and in communication with the air chamber, said tubular member being attached to the cap at such a downwardly and rearwardly slanting angle relative to the receptacle as will cause the forwardly positioned handle of the sprayer to rest upon the same support as that upon which the bottom of the receptacle is placed, said guard member preventing the passage of the spraying liquid into the air chamber when the sprayer is pointed downwardly in a slanting direction but allowing the air pressure of the air chamber to be transmitted to the receptacle through the air port in the guard, said liquid supply pipe normally remaining assembled upon the pump cylinder and in the air outlet pipe during disconnection of the pump cylinder from the liquid receptacle for replenishing or emptying the liquid or for casual cleaning of the device but the said liquid supply pipe being entirely removable from and replaceable into the cylinder and the air outlet pipe for more thorough cleaning or replacement.

MYRON H. SMITH.